W. M. SMITH.
CAR FRAME.
APPLICATION FILED JUNE 17, 1914.
1,141,845.
Patented June 1, 1915.
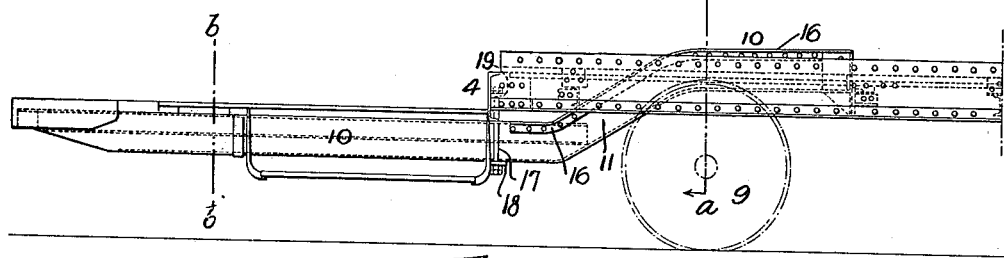
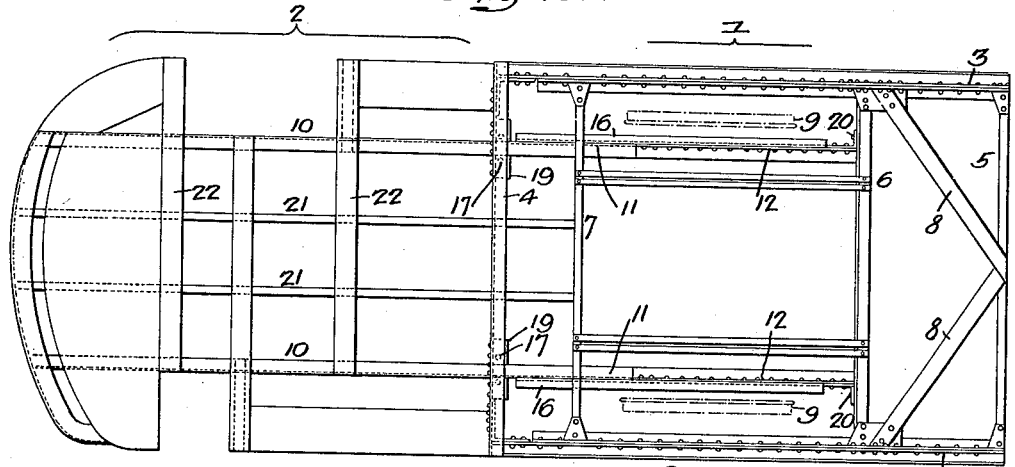
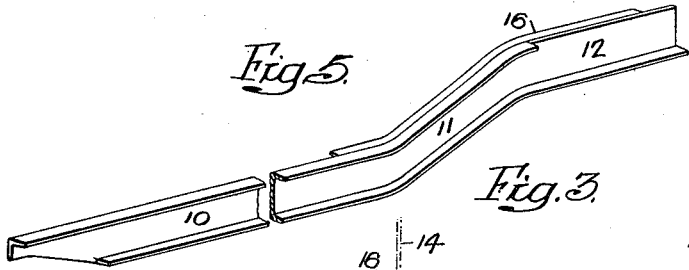
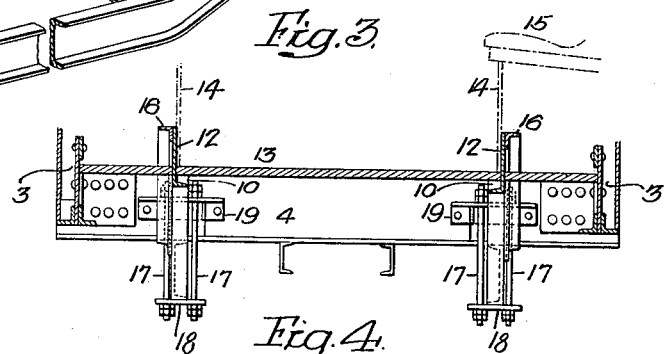
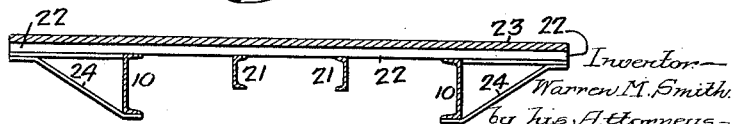

UNITED STATES PATENT OFFICE.

WARREN M. SMITH, OF MOORES, PENNSYLVANIA, ASSIGNOR TO THE J. G. BRILL COMPANY, OF PHILADELPHIA, PENNSYLVANIA, A CORPORATION OF PENNSYLVANIA.

CAR-FRAME.

1,141,845.  Specification of Letters Patent.  Patented June 1, 1915.

Application filed June 17, 1914. Serial No. 845,690.

*To all whom it may concern:*

Be it known that I, WARREN M. SMITH, a citizen of the United States, and a resident of Moores, county of Delaware, State of Pennsylvania, have invented certain Improvements in Car-Frames, of which the following is a specification.

The object of my invention is to provide means for properly supporting the overhanging beams which carry the platform of a passenger car, particularly cars having a long wheel base in which the axles are carried by the frame of the car and not by an independent truck, but it will be understood that the invention can be applied to a car body having any type of support without departing from the essential features of the invention.

The invention is particularly adapted for use in connection with short double deck cars having a long wheel base which will furnish sufficient platform support.

In the accompanying drawings: Figure 1 is a side view of one end of a car frame with the overhead structure removed and one of the wheels shown in dotted lines; Fig. 2 is a plan view; Fig. 3 is a transverse sectional view on the line *a—a*, Fig. 1; Fig. 4 is a transverse sectional view on the line *b—b*, Fig. 1; and Fig. 5 is a detached perspective view of one of the platform beams.

Referring to the drawings, 1 is the main frame of the car structure and 2 is the platform frame. The main frame consists of side beams 3, 3, an end sill 4, and intermediate beams 5, 6, and 7.

8, 8 are the cross ties.

9, 9 are the wheels.

10, 10 are the two main platform supporting beams which are shaped as clearly shown in Fig. 5 and which extend under the full length of the platform being bent at 11 so that the portion 12 of each beam will extend above the floor 13 of the car body, as illustrated in Fig. 3. These beams are spaced such a distance apart that they will project above the floor back of the front panel 14 of the longitudinal seats shown in dotted lines, Fig. 3, and in order to accommodate these panels the upper flange of the beam is cut away, as illustrated in Fig. 5. The beam is preferably reinforced by a small angle bar 16. The beams 10 are rigidly connected to the transverse sill 4, in the present instance by tie rods 17, which extend through plates 18 under the beams and these tie rods pass through brackets 19 on the sill 4. The rear end of each beam is secured to one of the intermediate beams 6 by angle brackets 20 so that the beam is rigidly supported by the framing of the car body and is clear of the axle and other mechanism carried thereby. Between the main beams 10 are beams 21 which extend the full length of the platform and terminate inside of the sill 4, as shown.

22, 22 are the cross members of the platform on which the floor 23 is mounted.

24, 24 are the angle braces which carry the overhanging portion of the platform, as shown in Fig. 4.

The construction of the platform may vary according to the type of car to which the invention is applied, but the principal idea is to design the main beams, which support the platform, so that they can be firmly secured to the main framing of the car body and this is accomplished by allowing the beams to project above the floor of the car back of the longitudinal seats, as shown.

While I prefer to cut away a portion of the upper flange of each beam, in some instances the flange may be retained and the beams set far enough apart to allow the flanged beams to extend above the floor back of the panels of the car seats.

I claim:

1. The combination in a car, of a car frame; a platform; and longitudinal beams supporting the platform and carried by the car frame, said beams being bent upward so as to extend above the floor of the car and rigidly secured to the transverse sill and to one of the transverse beams.

2. The combination in a car frame having longitudinal beams, a transverse sill and transverse beams, of a plate form; longitudinal beams secured to the under side of the sill of the main frame of the car and arranged to carry the platform, said beams being bent upward so as to clear the mechanism of the axle and to extend above the floor of the car; with a reinforcing angle secured to the portion of the beam extending above the floor of the car.

3. The combination in a car frame having longitudinal beams, a transverse sill and transverse beams, of a platform; longitudinal beams secured to the under side of the sill of the main frame of the car and arranged to carry the platform, said beams being bent upward so as to clear the mechanism of the axle and to extend above the floor of the car; a reinforcing angle secured to the portion of the beam extending above the floor of the car, the upper flange of each portion of the beam extending above the floor of the car being cut away; and longitudinal seats having their front panels located in front of the beams.

In testimony whereof, I have signed my name to this specification, in the presence of two subscribing witnesses.

WARREN M. SMITH.

Witnesses:
HENRY C. ESLING,
H. F. McKILLIP.

Copies of this patent may be obtained for five cents each, by addressing the "Commissioner of Patents, Washington, D. C."